(12) United States Patent
Nakabayashi

(10) Patent No.: US 7,237,948 B2
(45) Date of Patent: Jul. 3, 2007

(54) THERMAL SENSOR AND THERMAL SENSOR HOUSING MECHANISM

(75) Inventor: Hideki Nakabayashi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/019,283

(22) Filed: Dec. 23, 2004

(65) Prior Publication Data

US 2005/0175066 A1   Aug. 11, 2005

(30) Foreign Application Priority Data

Feb. 10, 2004   (JP)   ............................. 2004-033708

(51) Int. Cl.
G01K 1/08    (2006.01)
G01K 1/14    (2006.01)
G01K 13/00   (2006.01)

(52) U.S. Cl. ...................................... 374/148; 374/208

(58) Field of Classification Search ................ 374/148, 374/208

See application file for complete search history.

(56) References Cited

U.S. PATENT DOCUMENTS 3,845,661 A * 11/1974 Hollweck et al. ........... 374/208
5,733,044 A     3/1998 Rose et al.

FOREIGN PATENT DOCUMENTS

JP    A-2001-241584    9/2001

OTHER PUBLICATIONS

First Office Action from Chinese Patent Office issued on Aug. 14, 2006 for the corresponding Chinese patent application No. 2005100059932 (a copy and English translation thereof).

Notice of Final Rejection from Korean Patent Office issued on Sep. 18, 2006 for the corresponding Korean patent application No. 10-2004-0110404 (a copy and English translation thereof).

* cited by examiner

*Primary Examiner*—Gail Verbitsky
*Assistant Examiner*—Mirellys Jagan
(74) *Attorney, Agent, or Firm*—Posz Law Group, PLC

(57) ABSTRACT

A thermal sensor is pushed into a housing bushing so that a pin of the sensor is locked in an opening of the housing bushing. The thermal sensor is thereby easily fixed within the housing bushing. Further, the thermal sensor does not rotate within the housing bushing.

1 Claim, 7 Drawing Sheets

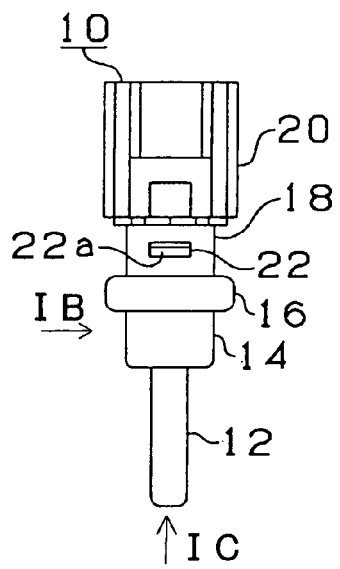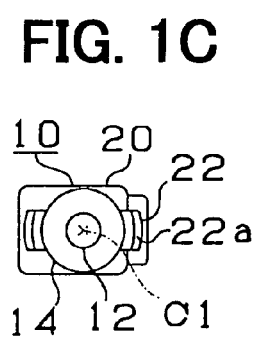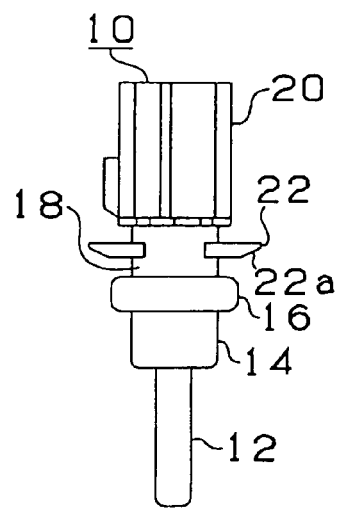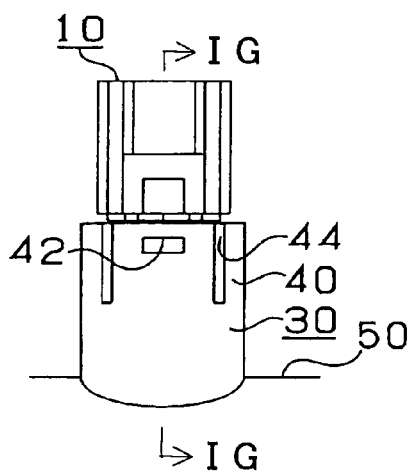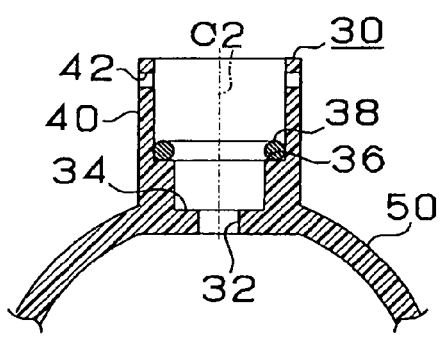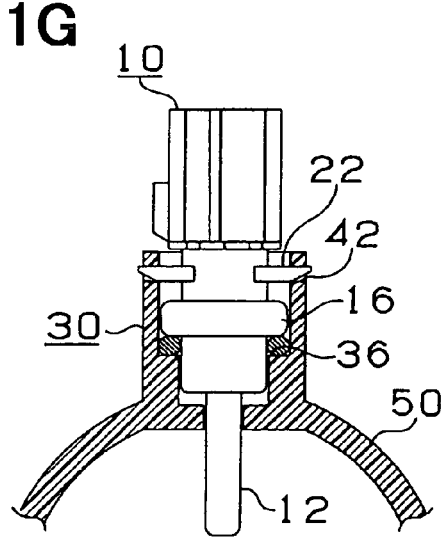

↑ VB

THERMAL SENSOR AND THERMAL SENSOR HOUSING MECHANISM

CROSS REFERENCE TO RELATED APPLICATIONS

This application is based on and incorporates herein by reference Japanese Patent Application No. 2004-33708 filed on Feb. 10, 2004.

FIELD OF THE INVENTION

The present invention relates to a thermal sensor and a thermal sensor housing mechanism. Here, the thermal sensor is fitted into a housing bushing that is disposed to extend perpendicularly to a coolant passage. The thermal sensor housing mechanism includes a housing bushing of a cylindrical wall that is disposed to extend perpendicularly to a coolant passage, and a thermal sensor that is coaxially fitted into the housing bushing.

BACKGROUND OF THE INVENTION

A thermal sensor is used for measuring temperatures of a coolant fed to an engine of a vehicle. Conventionally, this thermal sensor is attached into a housing bushing that is installed in a coolant pipe. A method for attaching the thermal sensor into the housing bushing is described in Patent Document 1.

Patent Document 1: JP-2001-241584 A

In this attaching method, a thermal sensor 110 is fixed, with a clip 148 (shown in FIG. 7B), into a housing bushing 130 installed in a coolant pipe 50, as shown in FIG. 7A. Further, the housing bushing 130 has a slit 134 that is circumferentially formed. The clip 148 is laterally inserted into the slit 134 just when the thermal sensor 110 is being pushed into the housing bushing 130.

However, this insertion of the clip is not easy work since the insertion is required to be performed just when the thermal sensor 110 is being pressed to a water-leakage preventing O-ring (not shown) within the housing bushing 130. Further, a position of the thermal sensor 110 is not predetermined, so that the thermal sensor 110 is not easily connected with a connector, which prevents the connection procedure from being automated. Furthermore, the thermal sensor 110 is rotatable with respect to an axis of the housing bushing 130. In a condition where a harness (not shown) attached to the thermal sensor 110 is vibrated during vehicle driving, the thermal sensor 110 possibly rotates to thereby damage the O-ring, resulting in leakage of the coolant.

SUMMARY OF THE INVENTION

It is an object of the present invention to provide a thermal sensor that is easily fixed into a housing bushing, and a thermal sensor housing mechanism where a thermal sensor is easily fixed to a housing bushing.

To achieve the above object, a thermal sensor is provided with the following. The thermal sensor attached into a housing bushing that is disposed perpendicularly to a coolant passage, includes a retaining portion that is used for being locked in a locking portion provided in the housing bushing.

In this structure, the thermal sensor can be easily fixed to the housing bushing. Further, the thermal sensor cannot be rotated within the housing bushing.

In a second aspect of the present invention, a thermal sensor housing mechanism including a housing bushing and a thermal sensor is provided with the following. The housing bushing includes a cylindrical wall disposed perpendicularly to a coolant passage, while the thermal sensor is coaxially attached within the housing bushing. Further, the thermal sensor housing mechanism includes a pin that is provided in the thermal sensor, an opening member that is provided in the housing bushing for locking the pin, and a slit that is provided in the housing bushing for the opening member to be capable of being shifted.

In this structure according to the second aspect, the thermal sensor can be easily fixed to the housing bushing and the thermal sensor cannot be rotated within the housing bushing. Furthermore, by virtue of the slit, the opening member can be flexibly deformed, so that the thermal sensor can be easily removed.

In a third aspect of the present invention, a thermal sensor housing mechanism including a housing bushing and a housing bushing is provided with the following. The housing bushing includes a cylindrical wall disposed perpendicularly to a coolant passage, while the thermal sensor is coaxially attached within the housing bushing. Further, the thermal sensor housing mechanism includes a fixing structure where the thermal sensor is fixed at a given position with respect to the housing bushing. This fixing structure can be achieved in any one of different manners. In a first fixing structure, a pin and a rib are provided in the thermal sensor, while an opening member and a rib groove member is provided in the housing bushing. Here, the opening member is for locking the pin, while the rib groove member is provided, parallel with an axis of the cylindrical wall, in an internal surface of the cylindrical wall of the housing bushing for the rib being inserted. Further, here, the rib groove member is provided asymmetric with respect to the axis of the cylindrical wall so that the thermal sensor is fixed at a given position with respect to the housing bushing. In a second fixing structure, three pins are provided in the thermal sensor, while three opening members are provided in the housing bushing for locking the three pins, respectively. Here, within three angles that are formed between adjoining pins within the three pins at an axis of the thermal sensor, at least one angle is different from other angles so that the thermal sensor is fixed at a given position with respect to the housing bushing. In a third fixing structure, a plurality of pins are provided in the thermal sensor, while a plurality of opening. members are provided in the housing bushing for locking the pins, respectively. Here, within the three pins, at least one pin has a shape different from shapes of other pins so that the thermal sensor is fixed at a given position with respect to the housing bushing.

In the above structure according to the third aspect, the thermal sensor is fixed at a given position with respect to the housing bushing, so that, for instance, a connection of a connector or the like with the thermal sensor can be automated.

BRIEF DESCRIPTION OF THE DRAWINGS

The above and other objects, features, and advantages of the present invention will become more apparent from the following detailed description made with reference to the accompanying drawings. In the drawings:

FIG. 1A is a side view of a thermal sensor in a thermal sensor housing mechanism according to a first embodiment of the present invention;

FIG. 1B is a side view taken from an arrow 1B in FIG. 1A;

FIG. 1C is a bottom plan view taken from an arrow IC in FIG. 1A;

FIG. 1D is a perspective view of a housing bushing in the thermal sensor housing mechanism according to the first embodiment;

FIG. 1E is a sectional view taken from a line IE—IE in FIG. 1D;

FIG. 1F is a side view showing a state that the thermal sensor is fixed to the housing bushing in the thermal sensor housing mechanism according to the first embodiment;

FIG. 1G is a sectional view taken from a line IG—IG in FIG. 1F;

DETAILED DESCRIPTION OF THE PREFERRED EMBODIMENTS

FIRST EMBODIMENT

Figure 2:
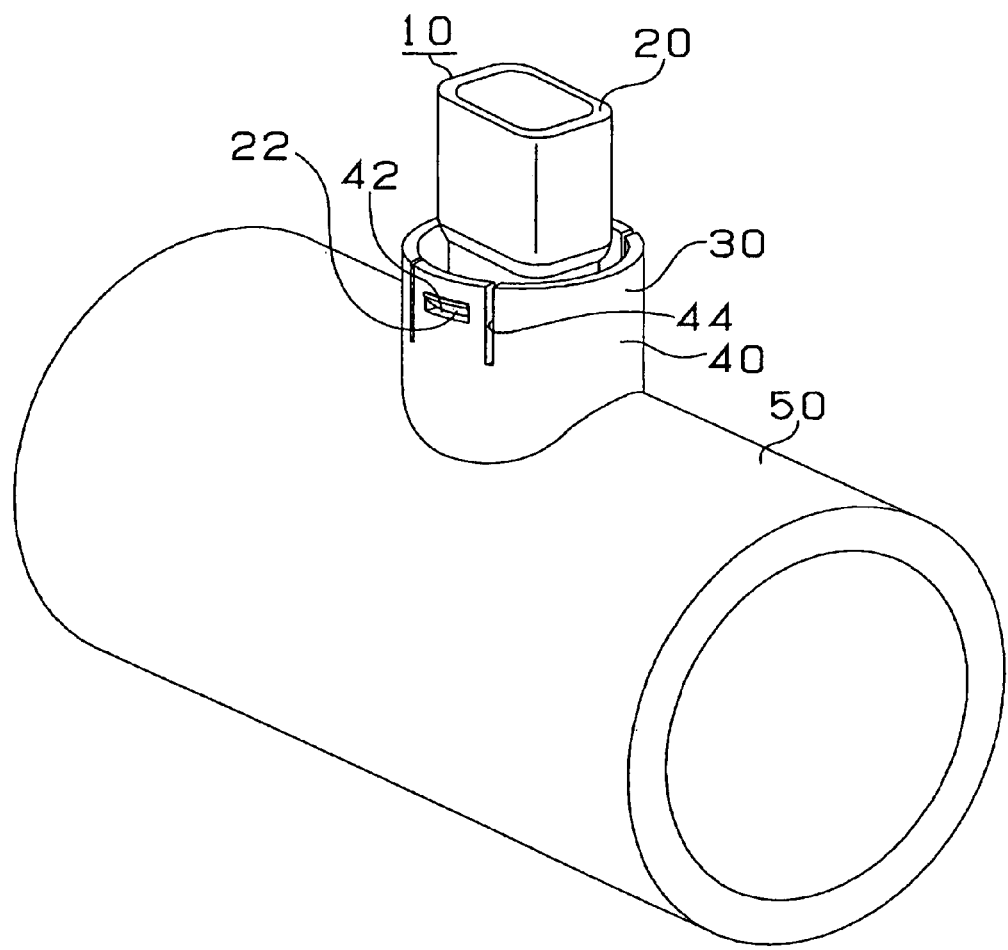
FIG. 2 is a perspective view showing a state that a thermal sensor is fixed to a housing bushing in a thermal sensor housing mechanism according to the first embodiment.

A thermal sensor housing mechanism according to a first embodiment of the present invention will be explained with reference to FIGS. 1A, 1B, 1C, 1D, 1E, 1E, 1G, 2, 3. As shown in FIG. 3, two coolant pipes 50 are provided between an engine 60 and a radiator 62. A coolant cooled in the radiator 62 is fed to the engine 60 through one of the cooling pipes 50. The other cooling pipe 50 is provided with a housing bushing 30 to which a thermal sensor 10 is fixed.

Figure 3:
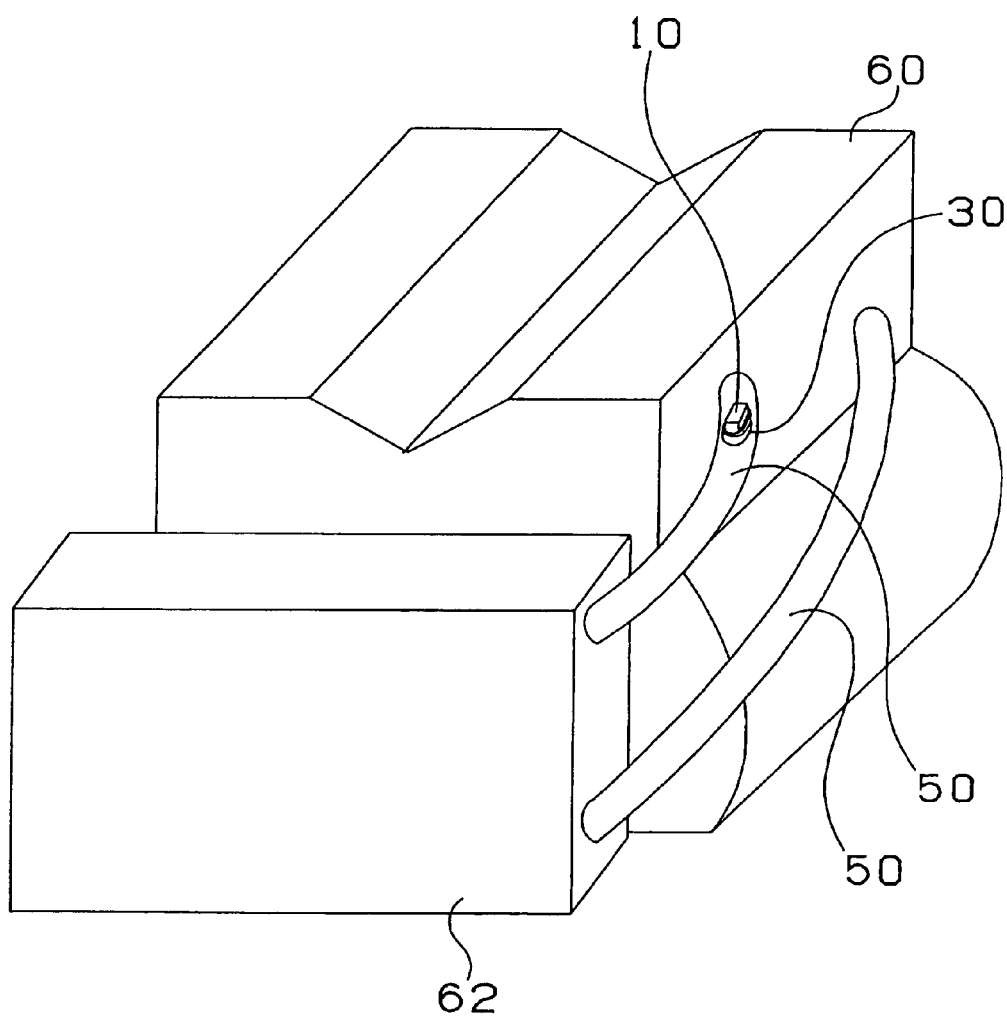
FIG. 3 is a perspective view showing a state that a thermal sensor according to the first embodiment is attached into a coolant pipe.

As shown in FIG. 2, the housing bushing 30 is constructed of a cylindrical wall 40 that is disposed to extend perpendicularly to the coolant pipe 50. The thermal sensor 10 is coaxially fitted within the housing bushing 30. The thermal sensor 10 is connected with an upper-located harness (not shown) via a connector (not shown), transmitting a thermal signal to an engine control device.

As shown in FIG. 1A, the thermal sensor 10 includes a cylindrical tip portion 12 for containing a thermal detection element (not shown), a cylindrical step portion 14 for supporting the tip portion 12, a flange portion 16 for contacting with an O-ring, a cylindrical neck portion 18 having a smaller diameter than that of the flange portion 16, and a connector portion 20 for connecting with a connector (not shown). The surfaces of the tip portion 12, the step portion 14, and the flange portion 16 are coated with copper plate. The copper plate is crimped above an upper surface of the flange portion 16. The connector portion 20 is provided with a signal terminal from the thermal detection element. The neck portion 18 is provided with a pair of pins 22 as a retaining portion disposed symmetrically with respect to an axis C1, as shown in FIGS. 1A, 1B, 1C. The pins 22 have tapers 22a in lower portions in proximity to their protruding ends (facing towards the tip portion 12, shown in FIG. 1B) so as to be easily inserted.

As shown in FIG. 1E, the housing bushing 30 is constructed of a cylindrical wall 40 that is disposed to extend perpendicularly to the coolant pipe 50, and a bottom wall 34. The bottom wall 34 includes in its center a communicating port 32 for the tip portion 12 of the thermal sensor 10 to pass through. The cylindrical wall 40 includes, in its portion adjoining the bottom wall 34, a step portion 36 whose diameter is smaller than that of the cylindrical wall 40. The step portion 36 contacts in its upper surface with the O-ring 38 that is used for preventing leakage of the coolant. The cylindrical wall 40 is further provided with a pair of openings 42 in proximity to the upper end of the cylindrical wall 40. The openings 42 are disposed symmetrically with respect to an axis C2 for catching the pins 22 of the thermal sensor 10. Further, slits 44 are provided in proximity to circumferential ends of the openings 42. The slits 44 are parallel with an axial direction of the cylindrical wall 40, reaching the upper end of the cylindrical wall 40. Under this structure, portions including the openings 42 can be deformed to be shifted towards inside and outside of the cylindrical wall 40.

In the thermal sensor housing mechanism of the first embodiment, when the thermal sensor 10 is fitted into the housing bushing 30, the thermal sensor 10 is pushed into the housing bushing 30 to thereby squeeze the O-ring 38. The pins 22 of the thermal sensor 10 are thereby locked in the openings 42 of the housing bushing 30. Here, the pins 22 have tapers 22a in their lower surfaces. When the tips or protruding ends of the pins 22 contact with the internal surface of the cylindrical wall 40, the openings 42 are shifted outward of the cylindrical wall 40 by virtue of the slits 44, causing the pins 22 easily to enter the openings 42. Under this condition, a repulsive force of the O-ring 38 biases the thermal sensor 10 upward, so that the pins 22 and the openings 42 are engaged or retained with each other. Further, when the thermal sensor 10 is removed from within the housing bushing 30, the openings 42 are shifted outward of the cylindrical wall 40, releasing the engagement between the pins 22 and the openings 42. The thermal sensor 10 is thereby easily removed.

Further, in this embodiment, the pins 22 of the thermal sensor 10 are locked by the openings 42 of the housing bushing 30, the thermal sensor 10 is not rotatable within the housing bushing 30. Therefore, even when vibration during vehicle driving affects the harness being attached to the thermal sensor 10, the sensor does not rotate, preventing the coolant leakage due to a damage of the O-ring 38.

SECOND EMBODIMENT

Figure 4A:
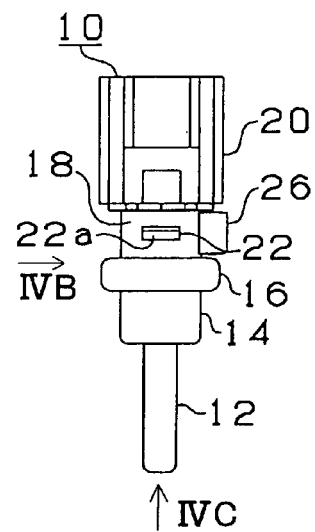
FIG. 4A is a side view of a thermal sensor in a thermal sensor housing mechanism according to a second embodiment of the present invention.
Figure 4C:
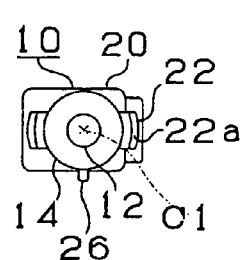
FIG. 4C is a bottom plan view taken from an arrow IVC in FIG. 4A.
Figure 4B:
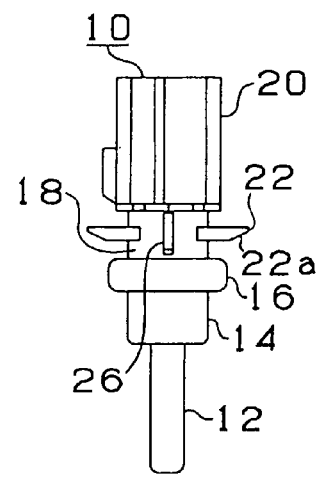
FIG. 4B is a side view taken from an arrow IVB in FIG. 4A.
Figure 4D:
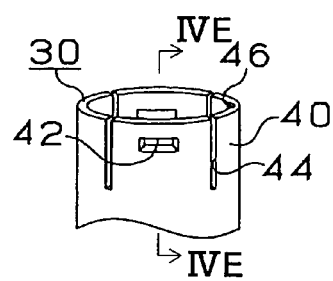
FIG. 4D is a perspective view of a housing bushing in the thermal sensor housing mechanism according to the second embodiment.

A thermal sensor housing mechanism according to a second embodiment of the present invention will be explained with reference to FIGS. 4A to 4G. The structure of the thermal sensor 10 of the second embodiment is the same as that of the first embodiment shown in FIG. 3; however, the thermal sensor 10 of the second embodiment includes a rib 26 in a neck portion 18, as shown in FIGS. 4A, 4B, 4C. Only one rib 26 is provided in the thermal sensor 10, and formed to be parallel with an axis C1 of the thermal sensor 10. That is, the rib 26 is disposed to be asymmetric.

Figure 4E:
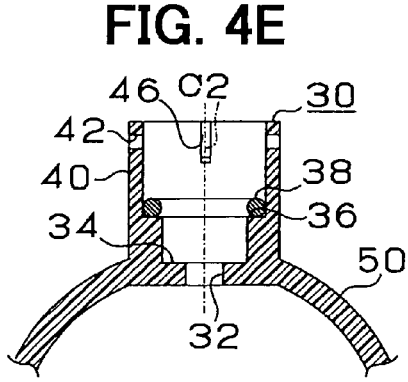
FIG. 4E is a sectional view taken from a line IVE—IVE in FIG. 4D.
Figure 4F:
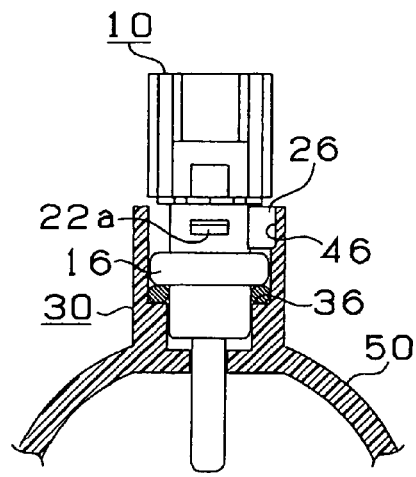
FIGS. 4F, 4G are sectional views showing a state that the thermal sensor is fixed to the housing bushing in the thermal sensor housing mechanism according to the second embodiment.
Figure 4G:
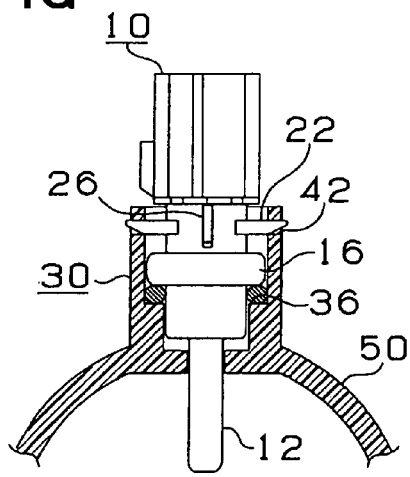

By contrast, as shown in FIGS. 4E, 4F, a housing bushing 30 is provided with a rib groove 46 that is disposed in a cylindrical wall 40, parallel and asymmetric with an axis C2, for receiving the rib 26.

In the thermal sensor housing mechanism of the second embodiment, since the thermal sensor 10 is pushed into the housing bushing 30 so that the pins 22 of the thermal sensor 10 are locked in openings 42 of the housing bushing 30, the thermal sensor 10 is easily fixed into the housing bushing 30. Further, since the pins 22 of the thermal sensor 10 are locked in the openings 42, the thermal sensor 10 does not rotate within the housing bushing 30. Furthermore, the rib 26 is provided in the thermal sensor 10, while the rib groove 46 is provided in the cylindrical wall 40 of the housing bushing 30 to be asymmetric with respect to the axis C2. The thermal sensor 10 is thereby fixed at a specific position with respect to the housing bushing 30. The connection of the connector to the thermal sensor 10 can be therefore automated.

THIRD EMBODIMENT

Figure 5A:
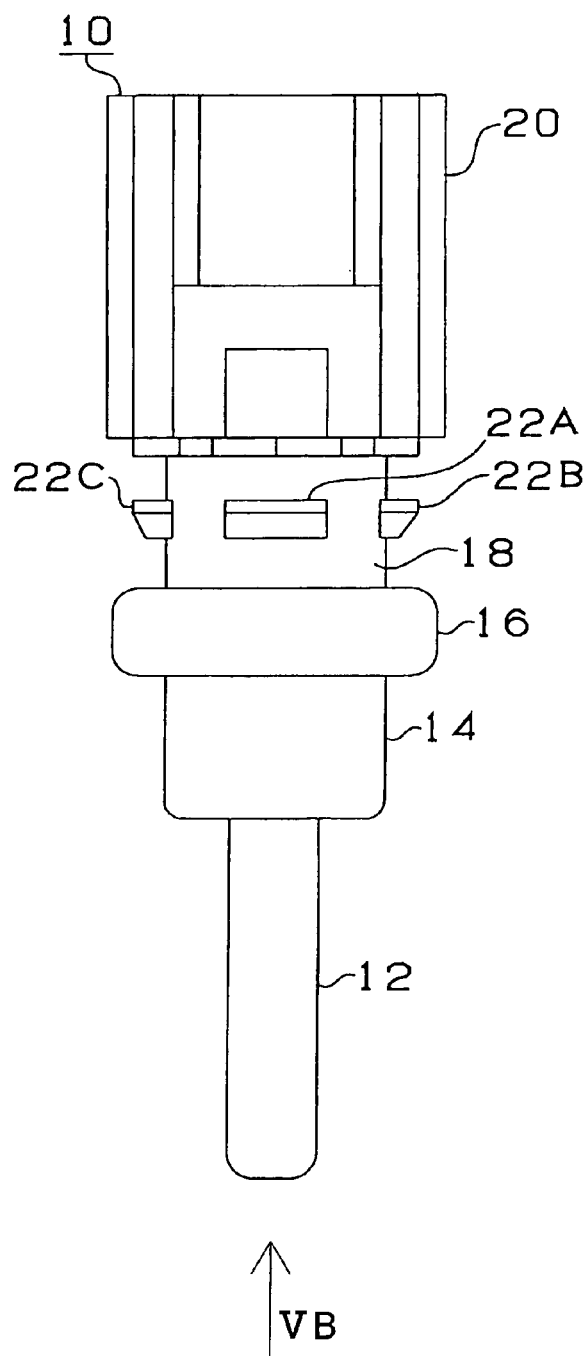
FIG. 5A is a side view of a thermal sensor in a thermal sensor housing mechanism according to a third embodiment of the present invention.
Figure 5B:
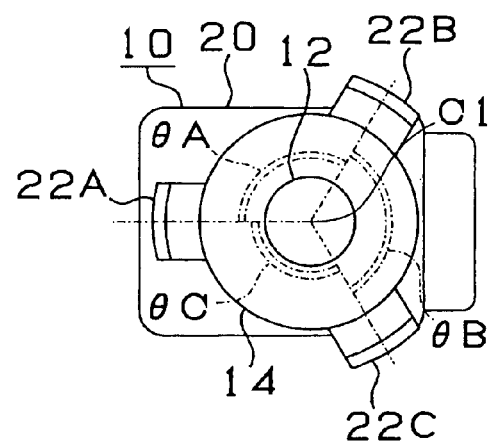
FIG. 5B is a bottom plan view taken from an arrow VB in FIG. 5A.
Figure 5C:
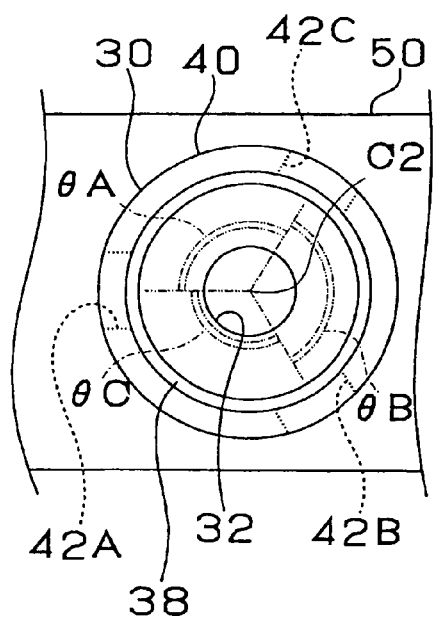
FIG. 5C is a plan view of a housing bushing in the thermal sensor housing mechanism according to the third embodiment.

A thermal sensor housing mechanism according to a third embodiment of the present invention will be explained with reference to FIGS. 5A to 5C. The structure of the thermal sensor 10 of the third embodiment is the same as that of the first embodiment shown in FIG. 3; however, the thermal sensor 10 of the third embodiment includes three pins 22A, 22B, 22C in the thermal sensor 10 (shown in FIGS. 5A, 5B) and three openings 42A, 42B, 42C in the housing bushing 30 (shown in FIG. 5C).

The pin 22A and the pin 22B form between their central axes an angle $\theta A$ of 125 degrees at an axis C1. The pin 22B and the pin 22C form between their central axes an angle $\theta B$ of 110 degrees at the axis C1. The pin 22C and the pin 22A form between their central axes an angle $\theta C$ of 125 degrees at the axis C1. That is, the angle $\theta B$ is set to 110 degrees, so that it is differentiated from the angles $\theta A$, $\theta C$ of 125 degrees. Likewise, in correspondence with the pins 22A to 22C, openings 42A to 42C are disposed between the housing bushing 30. The opening 42A and the opening 42B form between their central axes an angle $\theta A$ of 125 degrees at an axis C2. The opening 42B and the opening 42C form between their central axes an angle $\theta B$ of 110 degrees at the axis C2. The opening 42C and the opening 42A form between their central axes an angle $\theta C$ of 125 degrees at the axis C2.

In the thermal sensor housing mechanism of the third embodiment, since the thermal sensor 10 is pushed into the housing bushing 30 so that the pins 22A, 22B, 22C of the thermal sensor 10 are locked in the openings 42A, 42B, 42C of the housing bushing 30, the thermal sensor 10 is easily fixed into the housing bushing 30. Further, since the pins 22A, 22B, 22C of the thermal sensor 10 are locked in the openings 42A, 42B, 42C, the thermal sensor 10 does not rotate within the thermal bushing 30. Further, the thermal sensor 10 includes three pins 22A, 22B, 22C that have not equal angles at the axis C1 between the adjoining pins, while the housing bushing 30 includes the openings 42A, 42B, 42C for accommodating the corresponding pins 22A, 22B, 22C, respectively. The thermal sensor 10 is thereby fixed at a specific position with respect to the housing bushing 30. The connection of the connector to the thermal sensor 10 can be thereby automated. Here, the angles $\theta A$, $\theta C$ are equal with each other, but different from the angle $\theta B$; however, the respective angles $\theta A$, $\theta B$, $\theta C$ can be different from each other.

FOURTH EMBODIMENT

Figure 6A:
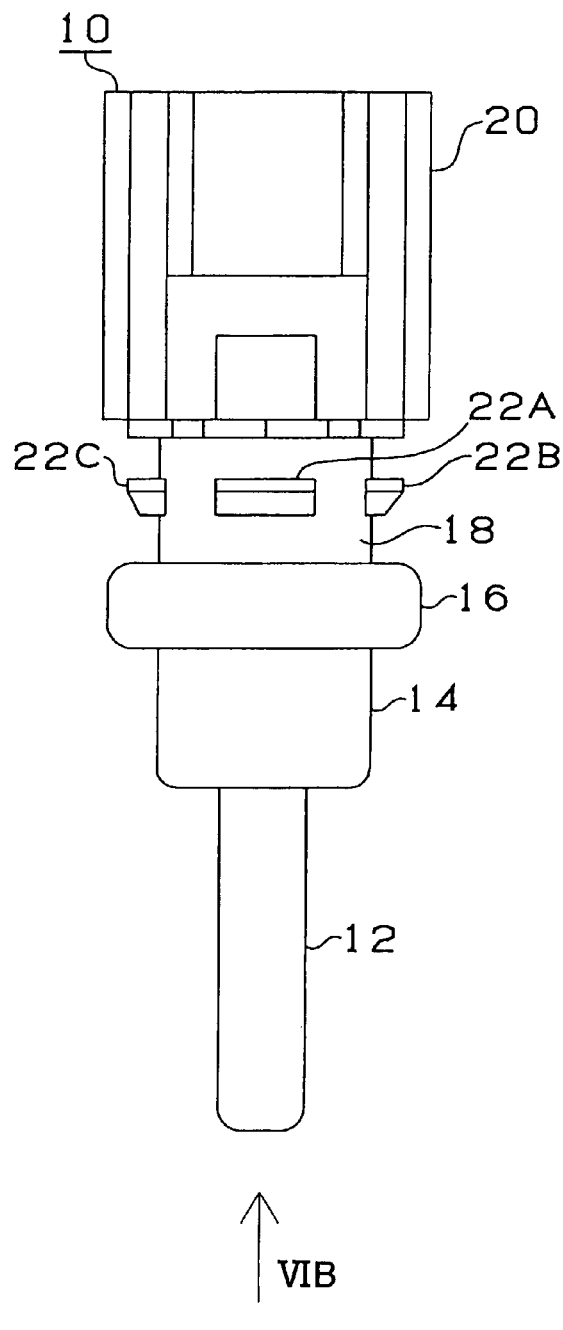
FIG. 6A is a side view of a thermal sensor in a thermal sensor housing mechanism according to a fourth embodiment of the present invention.
Figure 6B:
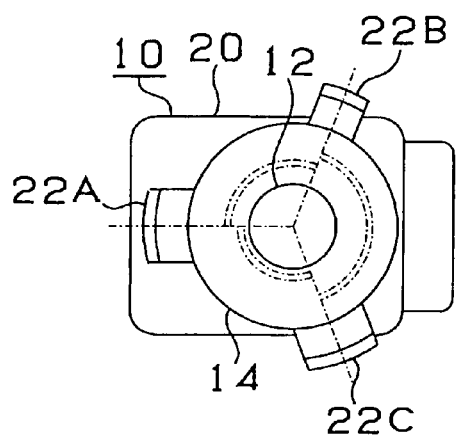
FIG. 6B is a bottom plan view taken from an arrow VIB in FIG. 6A.
Figure 6C:
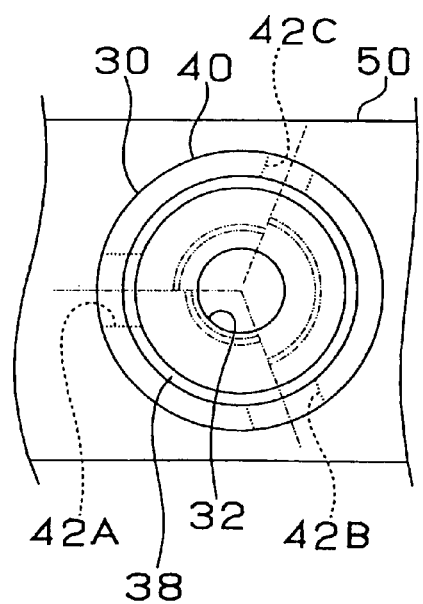
FIG. 6C is a plan view of a housing bushing in the thermal sensor housing mechanism according to the fourth embodiment.
Figure 7A:
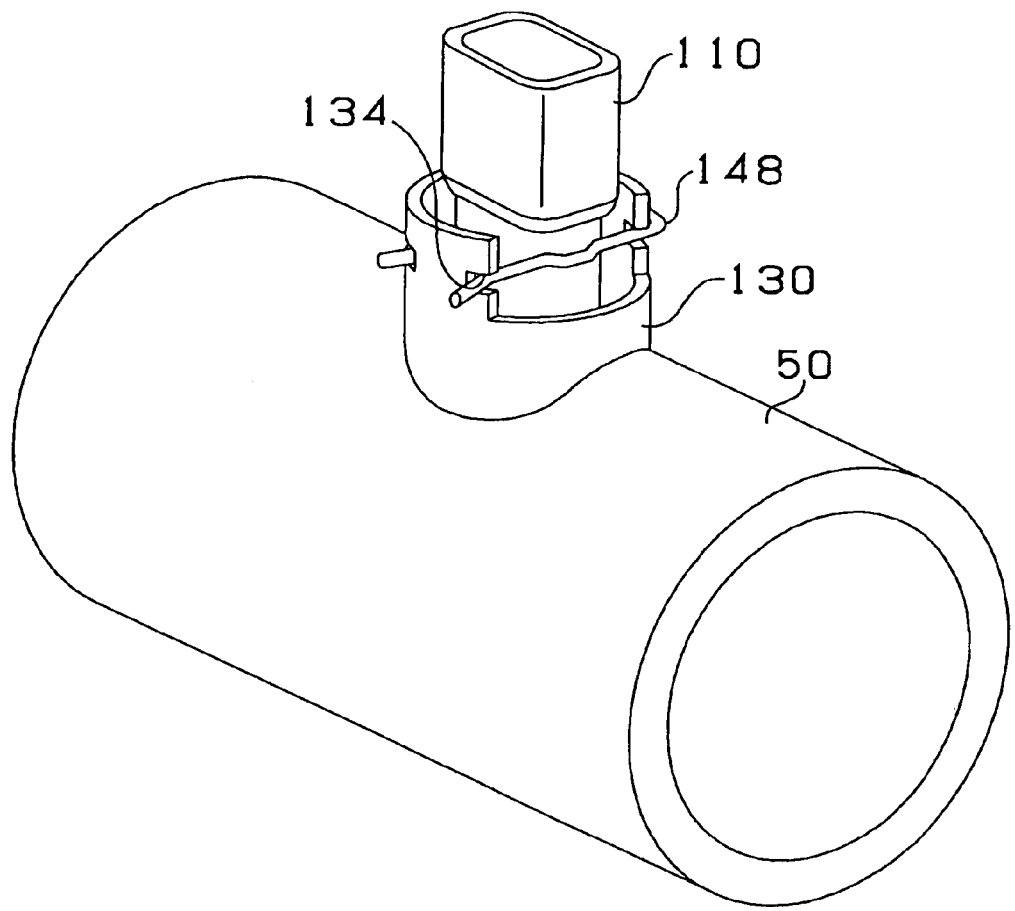
FIG. 7A is a perspective view of a state that a thermal sensor is fixed to a housing bushing in a prior art.
Figure 7B:
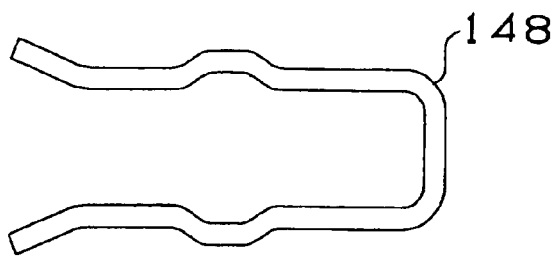
FIG. 7B is a plan view of a clip in a prior art.

A thermal sensor housing mechanism according to a fourth embodiment of the present invention will be explained with reference to FIGS. 6A to 6C. The structure of the thermal sensor 10 of the third embodiment is the same as that of the third embodiment shown in FIGS. 5A to 5C. In the third embodiment, the thermal sensor 10 includes three pins 22A, 22B, 22C that have not equal angles at the axis C1 between the adjoining pins. However, the thermal sensor 10 of the fourth embodiment includes three pins 22A, 22B, 22C that have equal angles of 120 degrees between the adjoining pins; further, the pin 22B is set to be smaller than the other pins 22A, 22C.

In the thermal sensor housing mechanism of the fourth embodiment, since the thermal sensor 10 is pushed into the housing bushing 30 so that the pins 22A, 22B, 22C of the thermal sensor 10 are locked in the openings 42A, 42B, 42C of the housing bushing 30, the thermal sensor 10 is easily fixed into the housing bushing 30. Further, since the pins 22A, 22B, 22C of the thermal sensor 10 are locked in the openings 42A, 42B, 42C, the thermal sensor 10 does not rotate within the thermal bushing 30. Further, the pin 22B is set to be smaller than the other pins 22A, 22C, while the housing bushing 30 includes the openings 42A, 42B, 42C for accommodating the corresponding pins 22A, 22B, 22C, respectively. The thermal sensor 10 is thereby fixed at a specific position with respect to the housing bushing 30. The connection of the connector to the thermal sensor 10 can be thereby automated.

Modification

In the above embodiments, the thermal sensor housing mechanism of the present invention is directed to a thermal sensor for a coolant. However, it can be also directed to any sensor fitted into a housing bushing that is perpendicular to a liquid-carrying passage. Further, in the above embodiments, the number of pins is two or three. However, it can be any number of one or more. Further, in the above embodiments, the thermal sensor includes a pin (convexity), while the housing bushing includes an opening (concavity). However, otherwise, the thermal sensor includes a pin (concavity), while the housing bushing includes an opening (convexity).

It will be obvious to those skilled in the art that various changes may be made in the above-described embodiments of the present invention. However, the scope of the present invention should be determined by the following claims.

What is claimed is:

1. A thermal sensor housing mechanism including (i) a housing bushing including a cylindrical wall, the cylindrical wall having a first end and a second end, wherein the first end is opposite to the second end, and the first end extends in a direction that is perpendicular to a coolant passage, and (ii) a thermal sensor coaxially attached within the housing bushing the thermal sensor housing mechanism comprising:
   a pin that is provided in the thermal sensor;
   an opening member that is provided in the housing bushing for locking the pin;
   two slits provided in the housing bushing, wherein the two slits extend in an axial direction of the cylindrical wall and reach the second end of the cylindrical wall;
   a wall portion, which is part of the cylindrical wall that includes the opening member, wherein the wall portion is located between the slits and is deformable such that the wall portion is movable radially inward and outward, wherein the pin is locked in the opening member by shifting the wall portion along with the opening member by means of the slits when the thermal sensor is fitted into the housing bushing;
   a rib that is provided in the thermal sensor; and
   a rib groove member that is provided, parallel with the axis of the cylindrical wall, in an internal surface of the cylindrical wall of the housing bushing for receiving the rib, wherein the rib groove member is asymmetric with respect to the axis of the cylindrical wall so that the thermal sensor is fixed at a given position with respect to the housing bushing.

* * * * *